United States Patent [19]
Leslie

[11] Patent Number: 5,664,921
[45] Date of Patent: *Sep. 9, 1997

[54] FASTENER COMPONENT IDENTIFICATION

[76] Inventor: William O. Leslie, P.O. Box 88, Troutlake, Wash. 98650

[*] Notice: The term of this patent shall not extend beyond the expiration date of Pat. No. 5,375,955.

[21] Appl. No.: 273,956

[22] Filed: Jul. 12, 1994

Related U.S. Application Data

[63] Continuation-in-part of Ser. No. 856,669, Mar. 24, 1992, Pat. No. 5,375,955.

[51] Int. Cl.[6] .................................................. F16B 37/00
[52] U.S. Cl. ........................ 411/427; 411/378; 81/DIG. 5
[58] Field of Search ............................... 411/427, 548, 411/378; D8/382, 387; 40/629, 631, 913; 81/DIG. 5, DIG. 11, 119, 436, 177.1, 180.1, 121.1

[56] References Cited

U.S. PATENT DOCUMENTS

| | | | |
|---|---|---|---|
| D. 126,409 | 4/1941 | Trott | D8/387 |
| 752,588 | 2/1904 | Rettig | 411/504 |
| 954,924 | 4/1910 | Brooks | 411/923 X |
| 1,516,547 | 11/1924 | Powell | 40/668 |
| 3,076,358 | 2/1963 | Paper et al. | 40/913 X |
| 3,550,244 | 12/1970 | Villo et al. | 403/292 X |
| 3,851,386 | 12/1974 | Ellzey, Jr. | 411/14 X |
| 3,916,736 | 11/1975 | Clemens | 81/DIG. 11 X |
| 4,685,848 | 8/1987 | Langer | 411/427 X |
| 4,808,050 | 2/1989 | Landt | 411/427 X |
| 5,031,488 | 7/1991 | Zumeta | 81/DIG. 5 X |
| 5,079,978 | 1/1992 | Kupfer | 81/DIG. 5 X |
| 5,181,439 | 1/1993 | Schwartz | 81/119 |

OTHER PUBLICATIONS

J. Johnson and C. Salmon, "Steel Structures," pp. 96–98, (1980).

American Society for Testing and Materials (ASTM), Designations A307–83a, A563–83a, F568–83, F593–82, F738–81 (1984).

*Primary Examiner*—Rodney M. Lindsey
*Attorney, Agent, or Firm*—Klarquist Sparkman Campbell Leigh & Whinston, LLP

[57] ABSTRACT

A fastener component, such as a nut, has size indicia thereon. The size indicia is used to identify the size of the tool to be used in attaching, adjusting or removing the fastener, a dimensional size of the fastener, or both.

7 Claims, 1 Drawing Sheet

FIG. 1
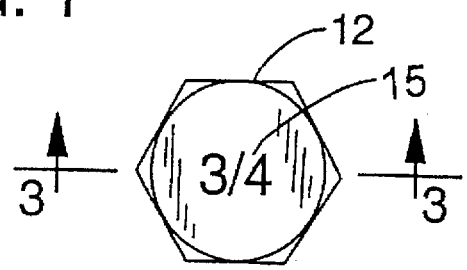
FIG. 2
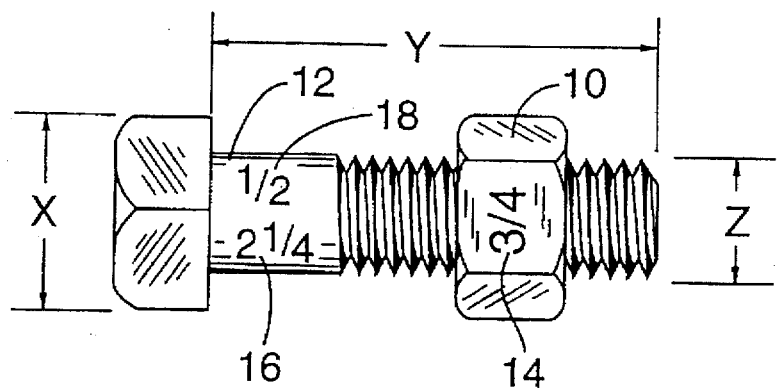
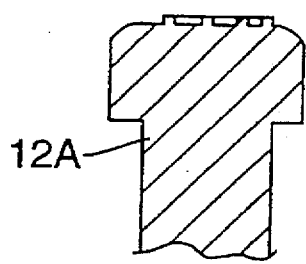
FIG. 3A
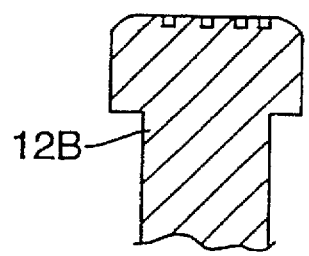
FIG. 3B
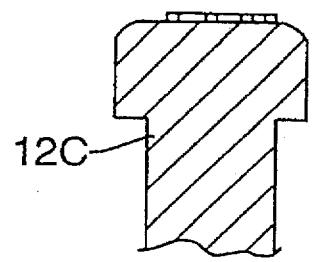
FIG. 3C 5,664,921

FASTENER COMPONENT IDENTIFICATION

This is a continuation-in-part of U.S. patent application Ser. No. 07/856,669 filed Mar. 24, 1992, now U.S. Pat. No. 5,375,955.

BACKGROUND OF INVENTION

This invention relates to methods for determining the size of fasteners, particularly nuts and bolts.

Fasteners such as nuts and bolts are among the most universal of products and are used daily by millions of people.

For the occasional user of fasteners, considerable time is wasted in determining the size of a particular fastener or fastener component. In particular, it is difficult for most people to determine the distance between the flats of a bolt head or nut merely by looking at the part.

A variety of techniques are used to assist the user in determining the size of the fastener part.

Fasteners usually come in bins, jars or other containers that bear labels showing the fastener sizes. But, in the normal course of working, it is common to end up with unmarked containers of assorted fastener components. Gauges are available to measure the size of such parts. And, measurements can be taken using a tape measure or ruler. Some products, such as wire nuts, are color coded.

For most fasteners, however, there is no quick visual clue to identify the fastener's size once it has been removed from its container. This results in delay while fastener components must be measured, or sized by trial and error, before they can be used.

Even more troublesome, once a fastener is selected, it is difficult to determine the size of the tool needed to secure the fastener. It is a particular problem that the dimensions given for nuts and bolts are not the same as the dimensions of the wrenches needed to tighten them. A casual user thus needs to determine the necessary wrench size by trial and error even if that person has the length and diameter dimensions of the fastener components.

SUMMARY OF THE INVENTION

The present invention provides a way to rapidly identify fastener component sizes, without taking measurements.

A particular object is to provide a way to rapidly identify the tool size necessary for attaching, adjusting or removing fastener components, without taking measurements or using trial and error.

According to the present invention, fasteners bear numerical size indicia so that they can be readily identified on sight. In particular, the invention relates to nuts that are adapted to be installed, adjusted or removed by a tool, such as a wrench.

In its simplest form, the present invention provides a nut marked with at least one visible numeral identifying the size of a wrench suitable for adjusting the nut when threaded onto a bolt. This allows the user to select a suitable wrench for adjusting the nut without knowing any other dimension of the nut or measuring the nut.

The visible numeral on the face of the fastener component can be either a raised or recessed numeral. The visible numeral may be stamped onto the surface of the fastener component using conventional metal stamping techniques.

Also provided by the present invention is a method of manufacturing a nut for which a suitable adjusting tool can readily be identified. This method comprises the steps of providing a nut and then placing a visible numeral on an external surface of the nut wherein the numeral indicates the distance between opposed faces of the nut, and thus, the size of a tool suitable for engaging the nut so that a suitable tool can be identified without a user having to know or measure any dimension of the nut.

BRIEF DESCRIPTION OF THE DRAWING

In the drawing:

FIG. 1 is a front elevation of a bolt bearing a size indicia;

FIG. 2 is a side elevational view of the bolt shown in FIG. 1 and a nut bearing a size indicia according to the present invention; and FIGS. 3A, 3B, 3C are partial sectional views taken along line 3—3 of FIG. 1, showing various forms of indicia.

DETAILED DESCRIPTION

According to the present invention, a fastener component comprises a body that defines a threaded bore wherein the body has a plurality of flat circumferential faces which provide tool-engaging surfaces. Located on the body of the fastener component, there is at least one visible numeral which indicates the distance between opposed faces on the body, and thus, the size of a tool suitable for engaging the opposed faces so that a suitable tool can be selected without a user having to know or measure any other dimension of the fastener component.

As illustrated in the drawing figures, nut 10 and bolt 12 bear visible numerical indicia 14, 15 which indicate the size (x) of the opening of the wrench to be used with a fastener. The fastener includes a bolt and nut, each of which has a plurality of flat, circumferential, tool-engaging faces or "flats". The size (x) is the distance between two opposed faces. In the illustrated embodiment, the indicia show the fraction "¾" which indicates ¾ inch wrenches mate with the bolt head and nut.

Although a nut and bolt are shown, the same type of indicia could be used for any type of fastener component held by a wrench, including most types of bolts, nuts, and lag screws.

Additionally, these bolts and nuts may bear indicia 16, 18 giving the length (y) and diameter (z) of the bolt shank and the inside diameter (z) of the threaded bore of the nut. But, while useful in selecting the proper fastener for a job, these dimensions are of no help in choosing the correct wrench or other installation tool since the outer dimensions of the bolt head and nut are larger. Both the indicia for indicating the proper wrench size and the indicia for indicating other fastener dimensions can be included on the same fastener.

There are several ways of applying indicia to the fasteners. The illustrated bolts and nut could be made using molds which apply either recessed or raised numbers when the fastener parts are cast. Raised numbers are shown in FIG. 3A; recessed numbers are shown in FIG. 3B. The raised numbers could also be in braille rather than arabic numbers for the visually impaired. In a preferred embodiment, indicia could be stamped on using conventional metal stamping techniques. Less preferably, the indicia could be painted on as shown in FIG. 3C. Paint is not preferred since it can wear off with time.

Having illustrated and described the principles of my invention with respect to a preferred embodiment, it should be apparent to those skilled in the art that my invention may be modified in arrangement and detail without departing from such principles. For example, although the drawings illustrate a bolt and nut sized in inches, the present invention can be used for fastener components sized in metric, or any other, units. I claim all such modifications falling within the scope and spirit of the following claims.

I claim:

1. A fastener component adapted to be installed, adjusted or removed by a tool, the component comprising:

a body that defines a threaded bore and that has a plurality of flat circumferential faces which provide tool-engaging surfaces; and located on the body, at least one visible numeral which indicates the distance between opposed faces on the body, and thus, the size of a tool suitable for engaging the opposed faces so that a suitable tool can be selected without a user having to measure any dimension of the fastener component.

2. The fastener component of claim 1 wherein the visible numeral is a raised numeral.

3. The fastener component of claim 1 wherein the visible numeral is a recessed numeral.

4. The fastener component of claim 1 wherein the numeral is stamped onto the body.

5. The fastener component of claim 1 wherein the threaded bore extends entirely through the body.

6. The fastener component of claim 1 wherein the component is a nut.

7. A nut marked with at least one visible numeral identifying the size of a wrench suitable for adjusting the nut when threaded onto a bolt.

* * * * *